US010796027B2

(12) United States Patent
Stratford et al.

(10) Patent No.: US 10,796,027 B2
(45) Date of Patent: Oct. 6, 2020

(54) METHODS AND A SYSTEM FOR SECURE DATA STORAGE

(71) Applicants: Ken Stratford, Worcester (GB); Ivan Knezovich, Far Forest Worcestershire (GB)

(72) Inventors: Ken Stratford, Worcester (GB); Ivan Knezovich, Far Forest Worcestershire (GB)

( * ) Notice: Subject to any disclaimer, the term of this patent is extended or adjusted under 35 U.S.C. 154(b) by 101 days.

(21) Appl. No.: 15/754,819

(22) PCT Filed: Aug. 25, 2016

(86) PCT No.: PCT/GB2016/052651
§ 371 (c)(1),
(2) Date: Feb. 23, 2018

(87) PCT Pub. No.: WO2017/033023
PCT Pub. Date: Mar. 2, 2017

(65) Prior Publication Data
US 2018/0247086 A1  Aug. 30, 2018

(30) Foreign Application Priority Data

Aug. 25, 2015  (GB) .................................. 1515112.9

(51) Int. Cl.
*G06F 21/00* (2013.01)
*G06F 21/81* (2013.01)
(Continued)

(52) U.S. Cl.
CPC ............ *G06F 21/81* (2013.01); *G06F 3/0622* (2013.01); *G06F 3/0634* (2013.01);
(Continued)

(58) Field of Classification Search
CPC ...... G06F 21/81; G06F 3/0673; G06F 3/0634; G06F 3/0622; G06F 21/78; G06F 2221/2137
See application file for complete search history.

(56) References Cited

U.S. PATENT DOCUMENTS

2008/0168247 A1*  7/2008  Goodwill ............ G06F 21/6218
                                                              711/163
2013/0185229 A1   7/2013  Naga et al.
(Continued)

OTHER PUBLICATIONS

International Search Report from corresponding PCT Application No. PCT/GB2016/052651, dated Oct. 28, 2016.
(Continued)

*Primary Examiner* — Jeffrey C Pwu
*Assistant Examiner* — William A Corum, Jr.
(74) *Attorney, Agent, or Firm* — Grossman, Tucker, Perreault & Pfleger, PLLC

(57) ABSTRACT

Methods and a system for secure data storage are described. In particular, a digital storage system for storing and retrieving user data is described, said system comprising: one or more independent digital storage devices, each digital storage device comprising a data storage device configured to store user data; a switch for regulating a supply of electrical power to the or each data storage device; and a security module for activating the switch and for storing timing restrictions that define a time window. The switch may only be activated to power the data storage device during the time window, improving the security of the user data.

17 Claims, 2 Drawing Sheets

(51) Int. Cl.
  *G06F 21/78* (2013.01)
  *G06F 3/06* (2006.01)
(52) U.S. Cl.
  CPC ............ *G06F 3/0673* (2013.01); *G06F 21/78* (2013.01); *G06F 2221/2137* (2013.01)

(56) References Cited

U.S. PATENT DOCUMENTS

2013/0311737 A1\* 11/2013 Shaw .................... G06F 21/305
  711/163
2015/0150082 A1\* 5/2015 Grube ................. G06F 11/1076
  726/1

OTHER PUBLICATIONS

Written Opinion of the International Searching Authority from corresponding PCT Application No. PCT/GB2016/052651, dated Oct. 28, 2016.
International Preliminary Report on Patentability, dated Feb. 27, 2018, in related International Application No. PCT/GB2016/052651, 6 pages.
Anonymous: Tech Stuff: Buffalo NAS 'auto' power mode; Jan. 13, 2013, XP055312101, retrieved from the Internet: URL:http/chris-hill-tech.blogspot.de/2013/01/buffalo-nas-auto-power-mode.html; 2 pages.

\* cited by examiner

METHODS AND A SYSTEM FOR SECURE DATA STORAGE

FIELD

The present disclosure describes methods and a system for secure data storage. In particular, a digital storage system for storing data and methods of storing and restricting access to data in a digital storage system and of retrieving data from a digital storage system are disclosed.

BACKGROUND

As the amount of electronic data produced requiring storage continues to increase, secure data storage is becoming an increasing necessity. Secure storage of physical hard copies of files and data is no longer practical or possible due to the volume and type of sensitive data being generated.

Existing data storage solutions typically rely on either physical backups that must be stored by the user, or cloud-based storage solutions that require rental of data storage space in a networked data storage server, utilising software solutions to maintain restricted access the data.

The information contained in many of the documents intended for storage is often important confidential information, as it may contain sensitive financial and legal information (for example contracts and wills), confidential personal details (such as medical records) or even data that may be relevant to security (e.g. password lists, safety records, etc.). However, users of such existing solutions, particularly cloud-based solutions, are often naively lax in ensuring that the documents are securely archived and their access highly restricted.

Whilst there are systems available that will allow users to encrypt their files, or even an entire storage medium, these are inevitably vulnerable to concerted efforts to decrypt. Furthermore, cloud-based systems are also potentially vulnerable to access by experts in computer networking and architectures. Furthermore, for all of the existing storage systems, data files are accessible at all times, even when encrypted. This can allow duplication of the encrypted data and/or the use of decryption techniques that analyse the structure of the data, manipulate the storage system, or that use brute-force methods to decrypt the encrypted data.

The present disclosure aims to at least ameliorate problems inherent with existing secure data storage systems.

SUMMARY

According to a first aspect of the present disclosure, there is provided a digital storage system for storing and retrieving user data, said system comprising: one or more independent digital storage devices, each digital storage device comprising a data storage device configured to store user data; a switch for regulating a supply of electrical power to the or each data storage device; and a security module for activating the switch and for storing timing restrictions that define a time window, wherein the switch may only be activated to power the data storage device during the time window.

The present invention provides a redundant, individualised digital storage system for the storage of user data that regulates data access to data stored within independent digital storage devices based on timing information. During a time window defined by the timing restrictions, an attempt to access the data can be made, providing correct authentication is provided. Access to the data is controlled by a switch that can only be activated during the time window. During times that lie outside of the time window, data access with the independent digital storage device is not possible.

Data access outside of the time window is prevented by electrically disconnecting the independent digital storage device from the data storage system. The independent digital storage device is powered off outside of the time window. It can be appreciated, that individual components relating to the data access may be powered off, rather than the entire independent digital storage device. For example, a data connection between the independent digital storage device and the user can be electrically disconnected outside of the timing window. In any case, the switch acts to regulate the supply of electrical power to the or each data storage device in this manner. The switch can only be activated to power the data storage device during the time window.

Additionally, data access may be prevented outside of the time window by a software based solution. The software based solution may act to prevent data access using a time dependent software lock. Alternatively, a time-dependent encryption technique may be utilised.

The present invention provides a greatly reduced risk of compromise of data stored in an independent digital storage device by unauthenticated attackers obtaining access to part of the data storage system. Each independent digital storage device provided in the data storage system is essentially isolated from each other. For example, an independent digital storage device can be completely electrically isolated from other independent digital storage devices. This ensures that the data of the individual user stored on an independent digital storage device is separate and completely isolated from the data of different users stored in other independent digital storage devices resident in the data storage system, with other timing restrictions set by the other users. Other forms of isolation, such as providing each independent digital storage device on a separate physical power and/or data connection, with no access to other independent digital storage devices are also possible.

In examples, the or each independent digital storage device contains a security module. Each security module can therefore store individual timing restrictions and individual timing windows for each independent digital storage device. It can be appreciated that locating the security module on the independent digital storage device increases the security of the device. This is particularly the case when the independent digital storage device only allows data access to the security module during a or the time window. However, it can be appreciated that a single security module may be used to control the switch, particularly in scenarios where multiple switches are used, one for each digital storage device.

Additionally or alternatively, the or each independent digital storage device may contain said switch. Providing a switch for each independent digital storage device further improves the security of the device and prevents malicious attempts to activate the switch outside the time window of each independent digital storage device. Similarly, it can be appreciated that a single relay or group of switches may be used, external to the independent digital storage system, that only activates a switch controlling the supply of electrical power to each data storage device in response to a command from its security module (either integrated with the independent digital storage system, or a master security module).

Further additionally or alternatively, the security module may comprise a processor for controlling the one or more independent digital storage devices. The processor may be used to control the switch, either when the switch is located within the independent digital storage system, or when the switch is external.

As described above, the data of each user is stored in an independent digital storage device. Accordingly, each independent digital storage device is electrically isolated from other independent digital storage devices. In embodiments, each independent digital storage device is electrically and/or physically isolated from all other independent digital storage devices and any other component of the digital storage system or any other electrical device, such as a cloud-based data storage system or the internet. The system is typically configured such that data is only electrically connected to the main storage system when data is being written or read—a process that typically takes only a few milliseconds.

As noted above, the storage system has a security module that defines access to the data only during the time window set by the user. The time window may be a repeating time period of a certain number of minutes, hours or seconds per day, or it may be only for certain days of the year or it may be a non-repeating time period. The time windows are typically electrical access control times, allowing or restricting electrical access to the independent digital storage devices during the specified times. The time windows may further define data modification control times, whereby data modification (i.e. data writes and deletions) may only be performed during the specified times. The key aspect is that the time window is controlled by the user and set, typically, during initial storage of the data in the independent digital storage device. Each independent digital storage devices typically has its own specific time window, independent of other independent digital storage devices within the storage system.

In embodiments, the security module is configured to receive and validate an access request from a user requesting data access to an independent digital storage device. Additionally, the access request may be provided by a technology platform of the user. Additionally or alternatively, the security module may require the access request to be made using a virtual private network to be a valid access request.

The security module may further comprise a clock for providing an access request time of an access request—a comparison allows for validation. The clock is typically a real-time clock. In particular, the security module is configured to compare the access request time to the stored timing restrictions such that the security module only allows activation of the switch in response to the access request if the access request time lies within the time window.

The security module may also be configured to restrict access only to users having an authorised identity. The security module may validate an access request using encryption protocols for authenticating the identity of a user providing an access request.

In embodiments, the independent digital storage devices are or comprise one or more solid-state drives—each solid-state drive assigned for access by a single user only. This ensures data integrity and removes the need for additional software based encryption techniques for the data stored on the independent digital storage devices. Although, it can be appreciated that encryption can still be used. This also ensures that in the unlikely event of an unauthorised successful attempt to access the data of an independent digital storage device, only one independent digital storage device and therefore one user is compromised. It also prevents unscrupulous users from attempting to access data stored by other users on the same digital storage devices—a potential problem with cloud-based storage solutions. A redundant array of independent individual digital storage devices may also be used to provide data integrity in the event of a failure of one of the devices.

The data storage device may be solid state drives as noted above. The processors may be single board computers such as a Raspberry Pi™.

As described above, the timing restrictions that may be set for each independent digital storage device are defined by each single individual user. This aids the security of the system—each independent digital storage device has a time window known only to the respective single individual user.

Additionally, the switch may be a relay that regulates the electrical supply to each independent digital storage device. The relay may be a universal serial bus controller, or may act to regulate electrical supply to a USB connector. Where present, the processor may control the power to the switch, relay, or data storage and/or it may control the power to any other electrical supply allowing them to be switched on and/or off.

In an alternative embodiment, the security module may further comprise encryption protocols for authenticating data access to each independent digital storage device. The encryption protocols may be ciphertexts associated with each independent digital storage device. 256 bit encryption techniques such as AES or an alternative symmetric or asymmetric encryption protocol may be used. The encryption protocols may additionally or alternatively be biometric based encryption methods. Example biometrics may include fingerprint scanning, retinal scanning or other biometric data. Two-stage authentication may also be used, such as sending an electronic message to a mobile phone via a messaging service, or using an app.

As noted above, in one example, the independent digital storage devices are a redundant array of data storage devices. Each independent digital storage device operates as an independent unit, and is located within a remote secure server environment.

The switch may allow data access from a user's independent digital storage device to a user's private network. An authenticated connection is generally used to ensure authenticity and integrity between the system and the individual user. Examples of such authenticated connections include virtual private networks and Secure File Transfer Protocol (SFTP) connections. The switch may also or alternatively allow a user to read and/or write files to and from the independent digital storage device. Data transfer from the user to the independent digital storage devices, via the private network is encrypted in the manner described above.

In examples, the switch may be automatically activated by the security module to power the data storage device at the beginning of the time window and be automatically deactivated to electrically disconnect the data storage device at the end of the time window.

The switch may provide data access only when a user reads and/or writes files to and from their independent digital storage device.

The switch may also control the supply of electrical power to provides data electrical access power only when a user reads and/or writes files to and from their independent digital storage device.

In a further embodiment, the switch is operable to physically disconnect the data storage device from the security module. This physically disconnection or decoupling may be automated using a robotic switch or actuation mechanism. By physically disconnect this is meant to mean that a physical pathway between the security module and the data storage device is discontinuous with either the components being decoupled or a physical switch or break preventing flow of electrical power to the data storage device. The physical disconnection by the switch may be an automated switch, said automated switch decoupling the data storage device and the security module outside of the time window.

In examples, the switch may regulate the supply of electrical power to the independent digital storage device(s).

In embodiments, the or each independent digital storage device may be associated with, and store data from, a single individual user.

As described above, in embodiments, each independent digital storage device may be a single board computer.

According to a 2$^{nd}$ aspect of the present disclosure, there is disclosed a method of storing and restricting access to data in a digital storage system comprising a switch, wherein said switch can be activated to regulate a supply of electrical power to one or more data storage devices, said method comprising the steps of: uploading data of a user to one of the data storage devices; storing timing restrictions specified by the user that define a time window; and preventing activation of the switch outside the time window to restrict access to the data.

In embodiments, the step of restricting activation of the switch may further comprise the step of: physically isolating the data storage device from the switch outside of the time window. The step of preventing the activation of the switch further may also or alternatively comprise the step of: physically isolating the independent digital storage device from the digital storage system outside of the time window. In such examples, the independent digital storage device may also be one or more of physically isolated and data communication isolated from the digital storage system.

In a further embodiment, the method may comprise the step of automatically activating the switch at the beginning of the time window and automatically deactivating the switch at the end of the time window. This automated switching may aid security by preventing the switch from being controlled by software, with a physical switch linked to a timer used.

In further embodiments, the method may comprise the step of identifying data for storage on a user's technology platform. Such platforms may be mobile applications, software running on a computer, such as a laptop, or a web-based platform.

According to a 3$^{rd}$ aspect of the present disclosure, there is disclosed a method of retrieving data from a digital storage system having a plurality of independent digital storage devices, each independent digital storage device comprising a data storage, said method comprising the steps of: requesting access to one of the independent digital storage devices corresponding to the user requesting access; establishing an authenticated connection between the user and their independent digital storage device; determining whether the present time of the requested access corresponds to an allowed time window; and supplying electrical power to the data storage of the independent digital storage device only if the present time is within the allowed time window.

In embodiments, the step of requesting access further comprises the step of identifying and selecting the independent digital storage device corresponding to the user requesting access. Authentication may be used to ensure that the correct independent digital storage devices is selected for the correct user.

In further embodiments, electrical power is supplied only during a data read and/or write access request. This further limits the time during which the independent digital storage devices are vulnerable to unauthorised data access attempts.

For all aspects, it may be appreciated that the independent digital storage devices may be actual physical storage devices rather than virtual partitions on a storage device.

There may be provided a computer program, which when run on a computer, causes the computer to configure any system or apparatus, including a circuit, controller, sensor, filter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), or a chip as non-limiting examples. The software implementation may be an assembly program.

The computer program may be provided on a computer readable medium, which may be a physical computer readable medium, such as a disc or a memory device, or may be embodied as a transient signal. Such a transient signal may be a network download, including an internet download.

These and other aspects of the disclosure will be apparent from, and elucidated with reference to, the embodiments described hereinafter.

BRIEF DESCRIPTION OF DRAWINGS

Embodiments will be described, by way of example only, with reference to the drawings, in which.

Figure 1:
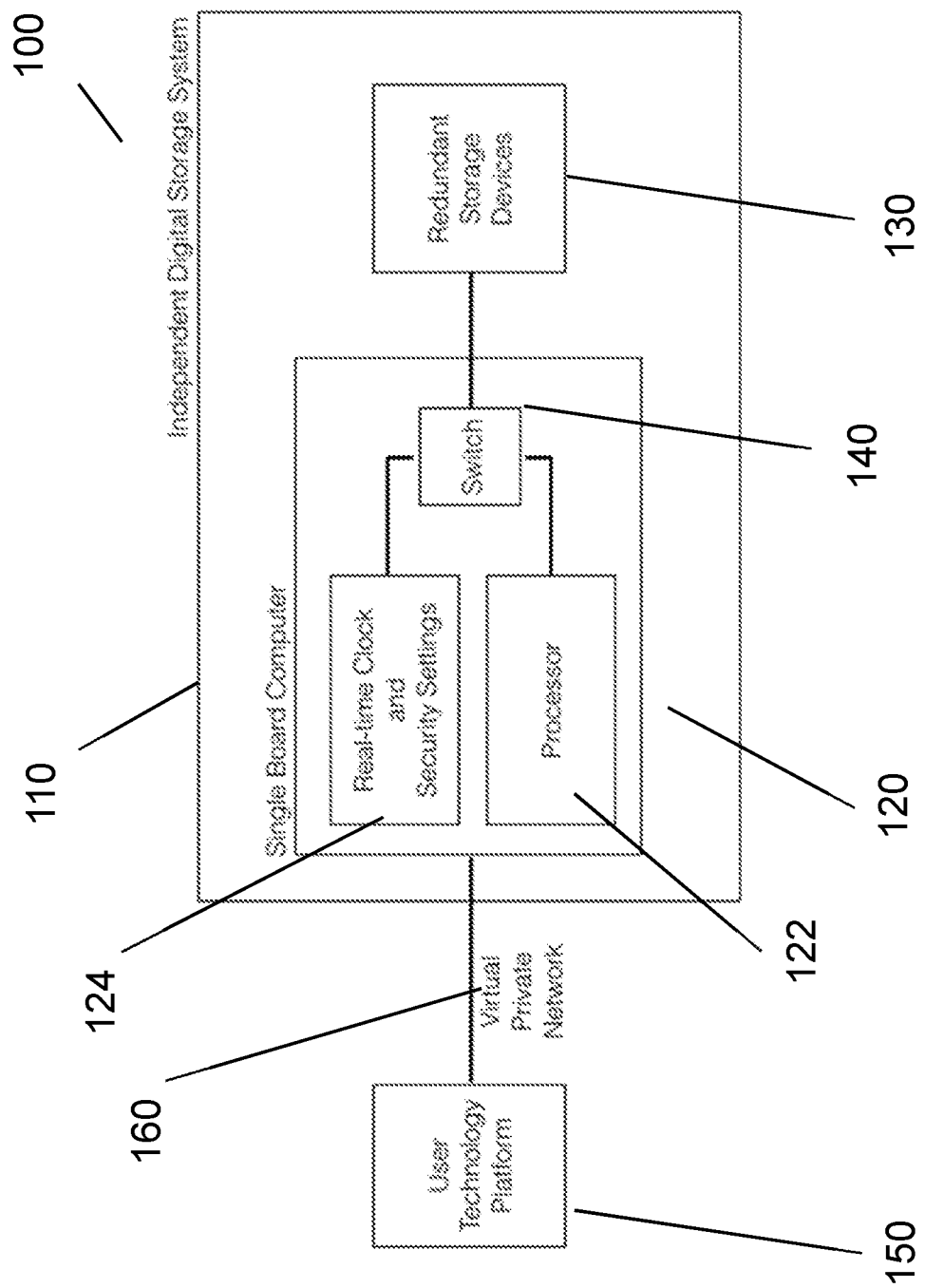
FIG. 1 shows a block diagram of the storage system according to at least one embodiment of at least one aspect of the present disclosure.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

According to one aspect of the present disclosure, a digital storage system 100 is provided as shown in FIG. 1. In the embodiment shown, the storage system 100 comprises one or more independent digital storage devices 110. Each independent digital storage device 110 typically comprises a single board computer 120 and also comprises a redundant storage device 130. The redundant storage device 130 stores private data for a single individual user.

The redundant storage device 130 may be an array of storage devices, providing data redundancy in the event of a failure. However, each redundant storage device contains the data of a single user. Each new user to the system 100 has their own independent digital storage device 110 with at least its own redundant storage device 130. It can be appreciated that the independent digital storage device 110 may share a single board computer with one or more other independent digital storage devices 110. However, each independent digital storage device 110 is associated with only one redundant storage device 130.

The redundant storage devices 130 are connected to the single board computer by a switch 140. The switch 140 in the example shown is a relay that electrically isolates the storage devices 130 from single board computer 120. The switch 140 therefore controls electrical access to the storage device 130. Activation of the switch allows access to the storage devices 130. The switch 140 may control data access and/or may be a physical or software based switch. Additionally, the switch may act to physically disconnect or decouple the data storage devices 130 from the single board computer 120.

The single board computer 120 generally has at least a processor 122 and a memory unit or security module 124 that saves details of time restrictions that define time windows during which electrical supply and therefore access to the data is allowed. The time restrictions are set by each single user for each single independent digital storage device 110. The memory unit or security module 124 may also comprise a real-time clock. The security module 124 also has password encryption information and protocols to allow for secure authentication of the user requesting access to data stored within their storage devices 130.

The user may request access to and control storage to and from the independent digital storage device 110 using a technology platform 150. The technology platform may be a remote access terminal, a computer, such as a laptop or a mobile device, such as an app running on a smartphone. The user technology platform 150 connects to the independent digital storage device 110 via a secure connection, such as a virtual private network 160.

Figure 2:
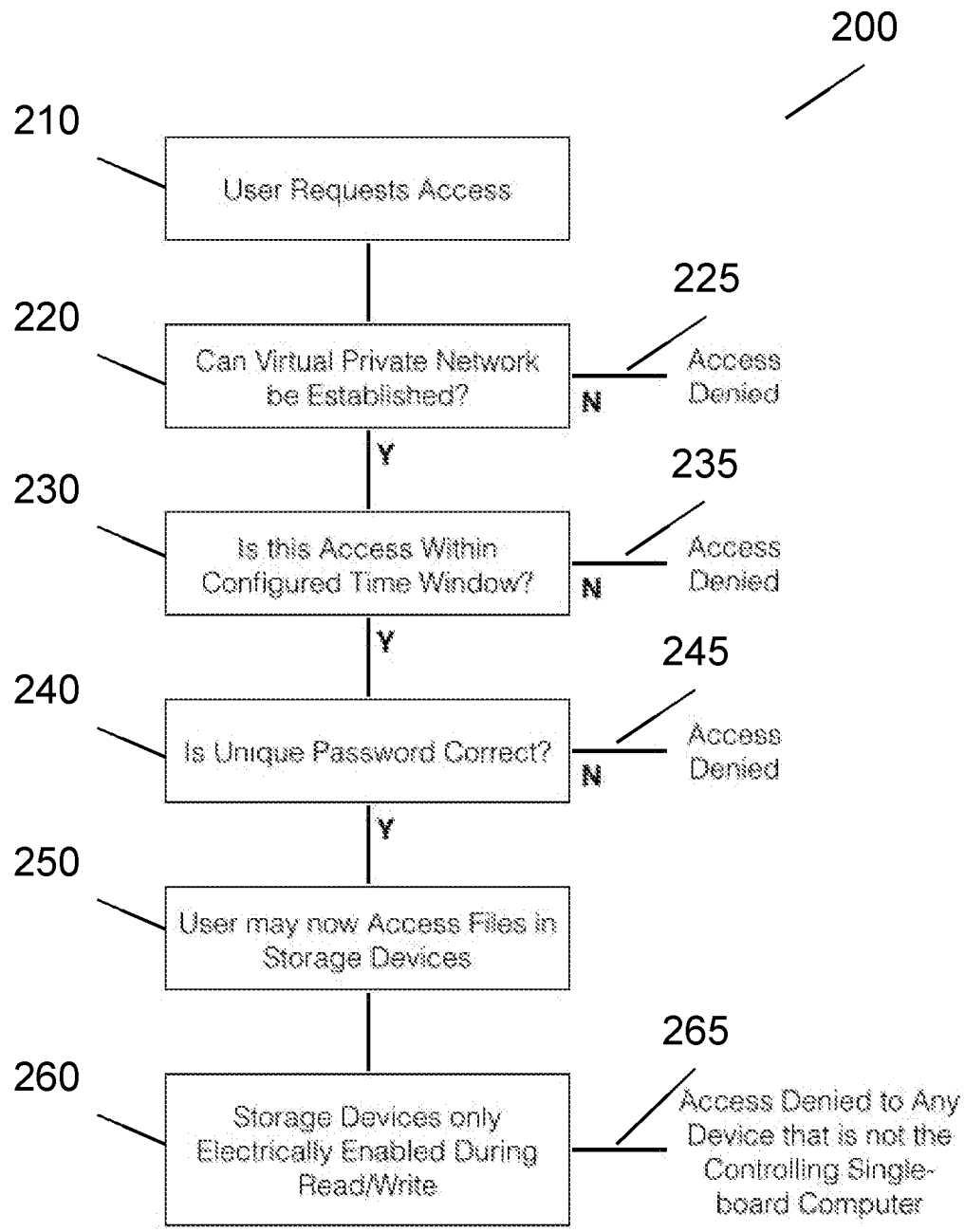
FIG. 2 shows a flow chart of a use of the storage system of FIG. 1 according to an embodiment of the present disclosure.

FIG. 2 describes a mode of operation 200 according to an aspect of the present disclosure. Once a user has stored data on the storage system 100 of FIG. 1 and specified security conditions including a time period or window during which the data stored within the independent digital storage device 110 can be accessed and/or modified, the user is able to request 210 access to the data.

Once the system detects an access request, the system checks 220 whether an encrypted and/or secure connection, such as a secure or virtual private network (VPN) can be setup. If a secure connection VPN cannot be set-up, access 225 is denied.

Once an encrypted connection or VPN is established, the system determines 220 whether the access request time is within the configured time window by comparing the present time as determined by the storage system 100 with the predefined time periods or windows. If a discrepancy is determined, access 235 is denied.

A password is then typically required to allow access to the data. The password may a standard encryption protocol authentication method and may include biometric information. If the unique password is correct, i.e. authentication is successful 240, the user may then access files in the independent data storage devices 110, 130 associated with that user. If the password is incorrect, access is denied 245.

Only upon successfully attempting access with the correct password at an allowed time is the switch 140 activated and the storage device electrically enabled. Indeed, the storage device may only be electrically enabled during a read and/or write request from a successful user. Outside of such requests, the storage devices 110, 130 remain electrically isolated from the single board computer 120 and the user's VPN 160.

From reading the present disclosure, other variations and modifications will be apparent to the skilled person. Such variations and modifications may involve equivalent and other features which are already known in the art of design realisation and extrusion and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, and reference signs in the claims shall not be construed as limiting the scope of the claims.

The invention claimed is:

1. A digital storage system for storing and retrieving user data, said system comprising:
one or more independent digital storage devices, each digital storage device comprising a data storage device configured to store a single user's data;
a switch for controlling data access to each data storage device and for regulating a supply of electrical power to each data storage device to supply electrical power only when each user reads and/or writes to and from a corresponding independent digital storage device of the one or more independent digital storage devices; and
a security module for activating the switch and for storing timing restrictions that define a time window, wherein the switch can only be activated to power the data storage device during the time window, and wherein the switch is operable to physically isolate each data storage device outside the time window.

2. The storage system of claim 1, wherein each independent digital storage device contains said security module.

3. The storage system of claim 1, wherein each independent digital storage device contains said switch.

4. The storage system of claim 1, wherein the security module comprises a processor for controlling each independent digital storage device.

5. The storage system of claim 1, wherein the security module is configured to receive and validate an access request from a user requesting data access to an independent digital storage device.

6. The storage system of claim 5, wherein the security module comprises a clock for providing an access request time of an access request, and wherein the security module is configured to compare the access request time to the stored timing restrictions such that the security module only allows activation of the switch in response to the access request if the access request time lies within the time window.

7. The storage system of claim 5, wherein the security module is configured to restrict access only to users having an authorised identity.

8. The storage system of claim 1, wherein the switch is a relay.

9. The storage device of claim 1, wherein the switch controls supply of electrical power to a universal serial bus connector connecting the security module to one of the one or more independent digital storage devices.

10. The storage system of claim 1, wherein the switch is automatically activated by the security module to power the data storage device at the beginning of the time window and automatically deactivated to electrically disconnect the data storage device at the end of the time window.

11. The storage system of claim 1, wherein the switch further comprises a data relay for controlling data access to the data storage device.

12. The storage system of claim 1, wherein the switch is an automated switch, said automated switch decoupling the data storage device and the security module outside of the time window.

13. The storage system of claim 1, wherein each independent digital storage device is a single board computer.

14. A method of storing and restricting access to data in a digital storage system comprising a switch and one or more independent digital storage devices, each digital storage device comprising a data storage device configured to store a single user's data, wherein said switch controls data access to each data storage device and can be activated to regulate a supply of electrical power to one or more data storage devices to supply electrical power only when each user reads and/or writes to and from a corresponding digital storage device, said method comprising the steps of:
    uploading data of a single user to one of the data storage devices;
    storing timing restrictions specified by the single user that define a time window; and
    preventing activation of the switch outside the time window to restrict access to the data based on physically isolating the data storage device from the switch outside of the time window.

15. The method of claim 14, wherein the switch automatically activates at the beginning of the time window and automatically deactivates at the end of the time window.

16. A method of retrieving data from a digital storage system having a plurality of independent digital storage devices, each independent digital storage device comprising a data storage device to store data of a single user, said method comprising the steps of:
    requesting access to one independent storage device of the plurality of independent digital storage devices corresponding to the user requesting access;
    establishing an authenticated connection between the user and the one independent physical digital storage device;
    determining whether the present time of the requested access falls within an allowed time window; and
    supplying electrical power to the data storage of the one independent digital storage device to supply electrical power only during a data read and/or write access request and only if the present time is within the allowed time window based on switching a physical connection between the data storage device of the one independent digital storage device and an electrical supply.

17. A method according to claim 16, wherein the step of requesting access further comprises the step of identifying and selecting the one independent digital storage device corresponding to the user requesting access.

\* \* \* \* \*